(12) United States Patent
Schmatloch et al.

(10) Patent No.: US 8,435,371 B2
(45) Date of Patent: May 7, 2013

(54) METHOD OF PREPARING GLASS AND CERAMIC ENAMELS ON GLASS FOR ADHESIVE BONDING

(75) Inventors: Stefan Schmatloch, Thalwil (CH); Robert J. Mills, Cannock (GB); Richard Steiner, Freienbach (CH); Edwin Zueger, Siebenen (CH)

(73) Assignee: Dow Global Technologies LLC, Midland, MI (US)

( * ) Notice: Subject to any disclaimer, the term of this patent is extended or adjusted under 35 U.S.C. 154(b) by 708 days.

(21) Appl. No.: 12/373,763

(22) PCT Filed: May 19, 2008

(86) PCT No.: PCT/US2008/064065
§ 371 (c)(1),
(2), (4) Date: Jan. 14, 2009

(87) PCT Pub. No.: WO2008/150679
PCT Pub. Date: Dec. 11, 2008

(65) Prior Publication Data
US 2009/0260742 A1 Oct. 22, 2009

Related U.S. Application Data

(60) Provisional application No. 60/932,243, filed on May 30, 2007.

(51) Int. Cl.
*C03C 27/08* (2006.01)
*C03C 27/06* (2006.01)
*C03C 27/10* (2006.01)

(52) U.S. Cl.
USPC .............. 156/99; 156/107; 156/108; 156/109

(58) Field of Classification Search .......... 510/180–182; 156/99, 107–109
See application file for complete search history.

(56) References Cited

U.S. PATENT DOCUMENTS

| | | | |
|---|---|---|---|
| 3,971,751 A | 7/1976 | Isayama et al. | |
| 4,315,825 A * | 2/1982 | Schweizer et al. | 508/485 |
| 4,315,828 A * | 2/1982 | Church | 510/405 |
| 4,374,237 A | 2/1983 | Berger et al. | |
| 4,618,656 A | 10/1986 | Kawakubo et al. | |
| 4,622,369 A | 11/1986 | Chang et al. | |
| 4,625,012 A | 11/1986 | Rizk et al. | |
| 4,628,644 A * | 12/1986 | Somers | 451/90 |
| 4,645,816 A | 2/1987 | Pohl et al. | |
| 4,673,523 A * | 6/1987 | Smith et al. | 15/104.93 |
| 4,687,533 A | 8/1987 | Rizk et al. | |
| 4,780,520 A | 10/1988 | Rizk et al. | |
| 4,784,786 A * | 11/1988 | Smith et al. | 15/104.93 |

(Continued)

*Primary Examiner* — Christopher Schatz
(74) *Attorney, Agent, or Firm* — The Dobrusin Law Firm, PC

(57) ABSTRACT

In one embodiment, the invention is a method comprising contacting a composition comprising i) alumina particles having a particle size of about 1 to about 40 microns and a Mohs hardness of about 9.0 to about 9.5; ii) one or more alkyl sulphates; iii) one or more thickeners; and iv) water with the surface of glass or a ceramic frit disposed on the surface of glass. The contacting can be performed by applying the composition to the surface of the glass or the ceramic frit using an application apparatus. In one embodiment, the composition further comprises a lubricant. In another embodiment, the composition further comprises one or more ethoxylated alcohols. In another embodiment, the composition further comprises one or more fragrances.

19 Claims, 2 Drawing Sheets

U.S. PATENT DOCUMENTS

| | | | |
|---|---|---|---|
| 4,788,254 A | 11/1988 | Kawakubo et al. | |
| 4,808,329 A | 2/1989 | Soldanski et al. | |
| 4,906,707 A | 3/1990 | Yukimoto et al. | |
| 4,923,927 A | 5/1990 | Hirose et al. | |
| 5,011,900 A | 4/1991 | Yukimoto et al. | |
| 5,063,269 A | 11/1991 | Hung | |
| 5,063,270 A | 11/1991 | Yukimoto et al. | |
| 5,076,955 A | 12/1991 | Ussat et al. | |
| 5,223,597 A | 6/1993 | Iwakiri et al. | |
| 5,342,914 A | 8/1994 | Iwakiri et al. | |
| 5,352,254 A * | 10/1994 | Celikkaya | 51/295 |
| 5,409,995 A | 4/1995 | Iwahara et al. | |
| 5,460,742 A * | 10/1995 | Cavanagh et al. | 510/398 |
| 5,500,273 A * | 3/1996 | Holmes et al. | 428/147 |
| 5,567,833 A | 10/1996 | Iwahara et al. | |
| 5,603,798 A | 2/1997 | Bhat | |
| 5,611,180 A * | 3/1997 | Agrawal et al. | 52/393 |
| 5,623,044 A | 4/1997 | Chiao | |
| 5,650,467 A | 7/1997 | Suzuki et al. | |
| 5,852,137 A | 12/1998 | Hsieh et al. | |
| 5,976,305 A | 11/1999 | Bhat et al. | |
| 5,985,817 A * | 11/1999 | Weibel et al. | 510/369 |
| 6,378,786 B1 * | 4/2002 | Beeston et al. | 239/333 |
| 6,512,033 B1 | 1/2003 | Wu | |
| 6,649,016 B2 | 11/2003 | Wu et al. | |
| 2002/0001550 A1 | 1/2002 | Shinjo et al. | |
| 2003/0019745 A1 | 1/2003 | Wang et al. | |
| 2006/0096694 A1* | 5/2006 | Zhou | 156/99 |
| 2007/0003584 A1 | 1/2007 | Anderson | |

\* cited by examiner

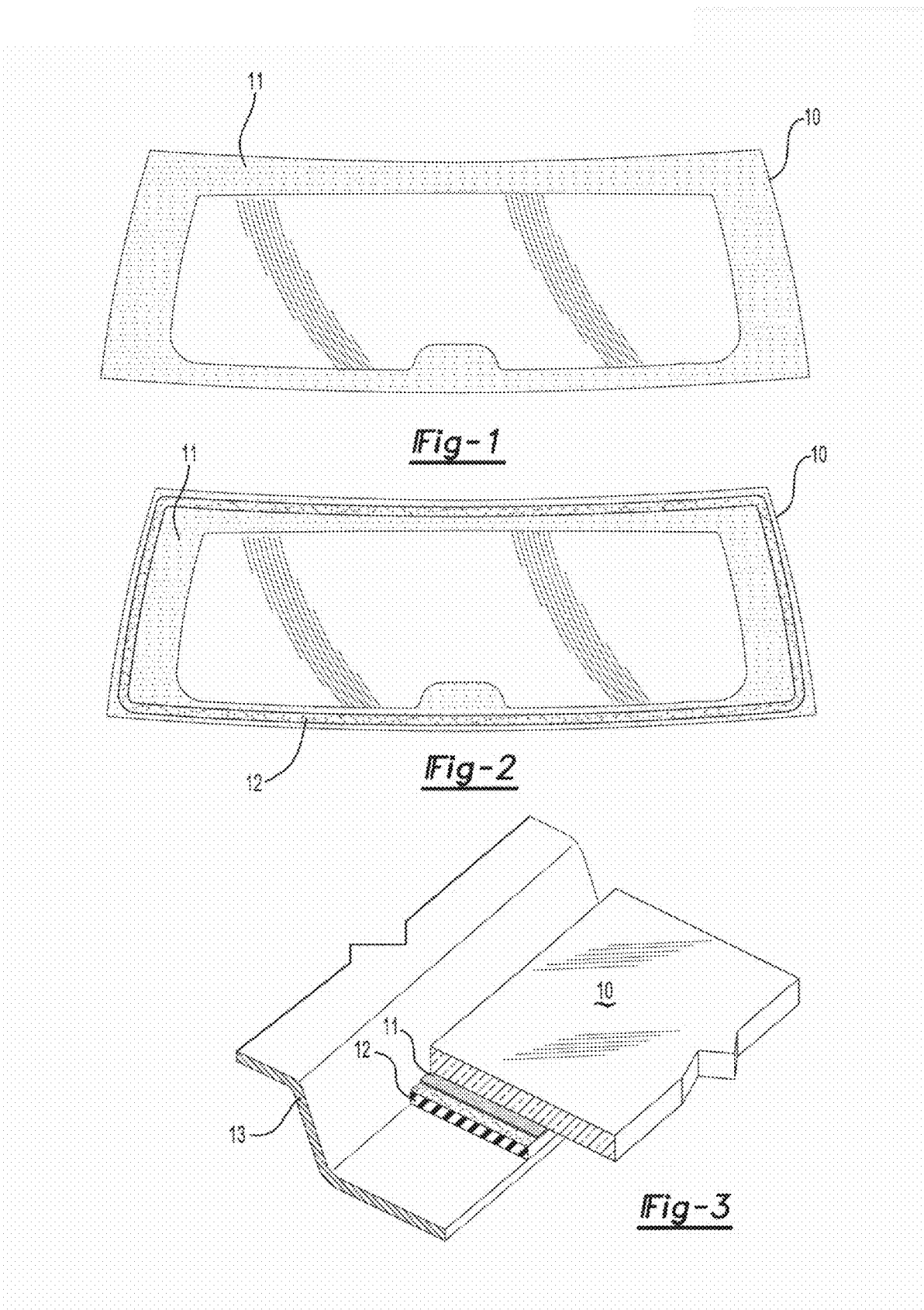

METHOD OF PREPARING GLASS AND CERAMIC ENAMELS ON GLASS FOR ADHESIVE BONDING

CLAIM OF BENEFIT OF FILING DATE

The present application claims the benefit of the filing date of U.S. Application Ser. No. 60/932,243, filed May 30, 2007, which is hereby incorporated by reference for all purposes.

FIELD OF INVENTION

The invention relates to a method of preparing a glass surface or a ceramic enamel frit on the surface of glass for adhesive bonding utilizing an alumina containing composition. The invention further relates to a method of bonding glass into a window frame wherein the glass or the ceramic enamel frit disposed on the glass is treated with an alumina containing composition prior to contacting the adhesive with the glass or ceramic enamel frit.

BACKGROUND OF INVENTION

Windows made from glass are often delivered with contaminants on the surface of the glass, such as silicone based materials. These contaminants can interfere with the bond of the adhesive used to bond the glass into a window frame. Glass windows often have disposed on the periphery of the window a ceramic enamel referred to as a frit. The ceramic enamel frit functions to block transmission of light to the adhesive used to bond the window into a structure and to enhance bonding of the adhesive to the window. The contaminants on the ceramic enamel frit located on the glass window are conventionally removed using an abrasive pad. The problem is that the abrasive pad can damage the ceramic enamel frit.

Several references disclose cleaning compositions which have been developed for cleaning glass, such as WO 2007/003584 to Sika; U.S. Pat. No. 4,808,329 to Henkel and U.S. Pat. No. 5,076,955 to Joh. A. Benckiser. Many cleaning solutions can damage the ceramic enamel frit surface, leave an undesired film or powder on the surface or interfere with the bonding of the adhesive to the glass or ceramic enamel frit surface.

What is needed is a method of preparing the surface of the glass, including the surface where the ceramic enamel is located, which does not harm the ceramic enamel or the glass surface or interfere in the bonding of an adhesive to the glass or ceramic enamel surface. What is further needed is a method which enhances the bonding of the adhesive to the glass surface or the ceramic enamel frit.

SUMMARY OF INVENTION

In one embodiment, the invention is a method comprising contacting a composition comprising i) alumina particles having a particle size of about 1 to about 40 microns and a Mohs hardness of about 9.0 to about 9.5;
ii) one or more alkyl sulphates;
iii) one or more thickeners; and
iv) water
with the surface of glass or a ceramic frit disposed on the surface of glass. The contacting can be performed by applying the composition to the surface of the glass or the ceramic frit using an application apparatus. In one embodiment, the composition further comprises a lubricant. In another embodiment, the composition further comprises one or more ethoxylated alcohols. In another embodiment, the composition further comprises one or more fragrances.

In another embodiment, the method further comprises the step of treating the surface of the ceramic frit. In yet another embodiment, the method further comprises applying a glass primer system to the surface of the ceramic frit after applying the composition containing alumina particles. In yet another embodiment, the method further comprises applying an adhesive to the surface of the glass or to the ceramic enamel frit disposed the surface of the glass and contacting the glass with a second substrate wherein the adhesive is disposed between the glass or the ceramic enamel frit disposed on the glass and the second substrate.

In another embodiment, the invention is a method of replacing a glass window in a structure which comprises a) removing the old glass window from the window frame; b) applying a composition comprising i) alumina particles having a particle size of about 1 to about 40 microns and a Mohs hardness of about 9.0 to about 9.5, ii) one or more alkyl sulphates, iii) one or more thickeners, and iv) water; to the surface of a glass replacement window or a ceramic frit disposed on the surface of a replacement glass window. The method optionally further comprises c) cleaning the surface of the glass or the ceramic enamel frit surface with a cleaner; and/or d) applying a primer system to the surface of glass or the ceramic enamel frit. The method may further comprise e) applying a bead of adhesive to the glass window around the periphery of the glass window or ceramic frit; f) applying an activator system to the adhesive remaining on a flange of the window frame and g) contacting the glass window with the window frame such that the adhesive is disposed between the glass window and the flange and that the adhesive forms a seal between the glass window and the window frame.

The method of the invention can be used to bond windows into structures such as automobiles and buildings. The method allows preparing and bonding of windows without interfering with the bonding of the adhesive to the glass or ceramic enamel frit surface. The method further enhances the bonding of the adhesive to the glass or ceramic enamel frit. In certain circumstances the method allows the adhesive to bond to the surface of the glass or the ceramic enamel frit without the need for one or both of the cleaning or priming steps. The method of the invention does not harm the glass or the ceramic enamel frit surface on the window.

DESCRIPTION OF FIGURES

FIG. 1 illustrates a window with a ceramic enamel frit located about the periphery of the window.

FIG. 2 illustrates a window with the adhesive disposed on the window.

FIG. 3 illustrates a stepped cross section of the bond between the structure and the window.

DETAILED DESCRIPTION OF THE INVENTION

Figure 4:
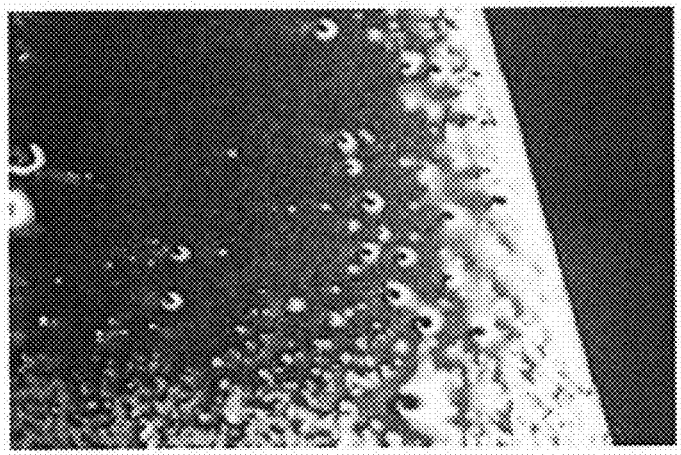
FIG. 4 shows a surface treated according to the process of the invention.

The method of the invention uses a composition which contains alumina particles to prepare the surface of the glass or ceramic enamel frit for adhesive bonding. The alumina particles may comprise any alumina particles which serve to prepare the surface of the glass or ceramic frit to which the composition containing the alumina particles is applied for adhesive bonding. Preferably, the alumina particles comprise one or more of hydrated alumina, calcined alumina, fused alumina, or aluminium oxide. More preferably, the alumina particles comprise calcined alumina. The alumina particles preferably exhibit a bulk density of about 0.5 Kg/L or greater and more preferably about 0.7 Kg/L or greater. The alumina particles preferably exhibit a bulk density of about 1.2 Kg/L or less and more preferably about 1.1 Kg/L or less. Preferably, the alumina particles exhibit an oil absorption of about 10 percent by weight or greater and more preferably about 30 percent by weight or greater. Preferably, the alumina particles exhibit an oil absorption of about 60 percent by weight or less, and more preferably about 50 percent by weight or less. Preferably, the alumina particles exhibit a specific surface area of about 0.5 $m^2/g$ or greater and more preferably about 1.0 $m^2/g$ or greater. Preferably, the alumina particles exhibit a specific surface area of about 16 $m^2/g$ or less, and more preferably about 10 $m^2/g$ or less. Preferably, the alumina particles exhibit an average particle size of about 1.0 microns or greater and more preferably about 5.0 microns or greater. Preferably, the alumina particles exhibit an average particle size of about 40 microns or less and more preferably about 20 microns or less. Preferably, the alumina particles exhibit a Mohs' hardness 9.0 microns or greater. Preferably, the alumina particles exhibit a Mohs' hardness of 9.5 microns or less. The alumina particles are present in the composition in a sufficient amount to prepare the glass or ceramic enamel frit for bonding of an adhesive to the surface of the glass or ceramic enamel frit. Preferably, the alumina particles are present in an amount of about 10 percent by weight or greater of the alumina containing composition and most preferably about 45 percent by weight of greater. Preferably, the alumina particles are present in an amount of about 80 percent by weight or less of the alumina containing composition and most preferably about 55 percent by weight of less.

The alumina containing composition further comprises a surfactant. More particularly, the surfactant comprises an alkyl sulphate. Any alkyl sulphate which enhances the formation of a stable alumina containing composition may be used. Stable in this context means that the composition does not phase separate and the alumina particles do not precipitate out of the suspension. Preferably, the alkyl sulphate is in the form of a salt with a cation counterbalance. Preferred cations include sodium, potassium and ammonium with sodium being most preferred. "Alkyl" as used in this context means a straight or branched chain hydrocarbon chain. Preferably, the alkyl moiety has about 8 carbon atoms or greater and more preferably about 10 carbon atoms or greater. Preferably, the alkyl moiety has about 16 carbon atoms or less and more preferably about 14 carbon atoms or less. Preferred alkyl sulphates include sodium lauryl (dodecyl) sulphate, sodium lauryl sulphate and ammonium lauryl sulphate and the like. The most preferred alkyl sulphates include sodium lauryl (dodecyl) sulphate. The alkyl sulphates are present in a sufficient amount to form a stable alumina containing composition. Preferably, the alkyl sulphates are present in an amount of about 0.1 percent by weight or greater of the alumina containing composition, more preferably about 0.3 percent by weight or greater and most preferably about 0.5 percent by weight or greater. Preferably, the alkyl sulphates are present in an amount of about 5 percent by weight or less of the alumina containing composition, more preferably about 2 percent by weight or less and most preferably about 0.9 percent by weight or less.

The alumina containing composition further comprises one or more thickeners. Any thickener which results in a stable suspension and provides a viscosity of the resulting formulation as described hereinafter may be used in the alumina containing composition. Preferred thickeners comprise one or more of cellulose, a derivative of cellulose, clay or an acrylic polymer. Examples of the cellulose derivatives include ethyl cellulose, hydroxy ethyl cellulose, hydroxy propyl cellulose, carboxy methyl cellulose, carboxy methyl hydroxyethyl cellulose, hydroxypropyl cellulose, hydroxy propyl methyl cellulose, and ethyl hydroxy ethyl cellulose. Examples of acrylic thickeners include polymers derived from methacrylic acid esters and acrylic acid esters and the like. Examples of clay thickeners include bentonites, refined betonites, kaolines, smectonite types, montmorillonite, talc and the like. The preferred class of thickeners is the hydroxyl alkyl cellulose derivatives. The amount of thickener present in the composition may be any amount which is effective in forming a stable suspension and results in the desired viscosity. Preferably, the composition of the present invention is thickened to a viscosity range of from about 8,000 to about 15,000 centipoise (about 80 to about 150 N-S/square meter), preferably to a viscosity of from about 9,000 to about 14,000 centipoise (about 9.0 to about 14.0 N-S/square meter), more preferably is in the range of about 10,000 to about 13,000 centipoise (about 10.0 to about 13.0 N-S/square meter). Preferably, the thickeners are present in an amount of about 0 percent by weight or greater of the alumina containing composition, more preferably about 0.1 percent by weight or greater and most preferably about 0.3 percent by weight or greater. Preferably, the thickeners are present in an amount of about 10 percent by weight or less of the alumina containing composition, more preferably about 5 percent by weight or less and most preferably about 0.5 percent by weight or less.

The alumina containing composition is dispersed in water. A sufficient amount of water to disperse the ingredients of the alumina composition and to give the desired viscosity is utilized. Preferably, water is present in an amount of about 15 percent by weight or greater of the alumina containing composition, more preferably about 20 percent by weight or greater, more preferably about 25 percent by weight or greater and most preferably about 35 percent by weight or greater. Preferably, the water is present in an amount of about 90 percent by weight or less of the alumina containing composition, more preferably about 80 percent by weight or less, even more preferably about 55 percent by weight or less and most preferably about 45 percent by weight or less.

The alumina containing composition may further comprise one or more lubricants. The one or more lubricants can be any lubricant which reduces the breakdown of the alumina particles in the alumina containing composition. Among preferred lubricants are hydrocarbons including mineral oil, triglyceride esters, polyolefines, esters, polyalkylene glycols, silicones and the like. Among more preferred lubricants are mineral oil and triglyceride esters. The most preferred lubricants are mineral oils. The lubricant is present in a sufficient amount to control the breakup of the alumina particles. Preferably, the lubricants are present in an amount of about 0 percent by weight or greater of the alumina containing composition, more preferably about 5 percent by weight or greater and most preferably about 9 percent by weight or greater. Preferably, the lubricants are present in an amount of about 25 percent by weight or less of the alumina containing composition, more preferably about 20 percent by weight or less and most preferably about 11 percent by weight or less.

The alumina containing composition may further comprise one or more ethoxylated alcohols. The one or more ethoxylated alcohols are present as additional emulsifiers. Preferred ethoxylated alcohols are ethoxylated fatty alcohols. Among preferred ethoxylated alcohols useful in the invention are linear and branched, saturated and unsaturated ethoxylated alcohols with about 6 to about 22 carbon atoms and mixtures thereof. More preferred ethoxylated alcohols include linear and branched lauryl alcohol ethoxylates, linear and branched undecyl alcohol ethoxylates, linear and branched tridecyl alcohol ethoxylates, linear and branched tetradecyl alcohol ethoxylates, linear and branched stearyl alcohol ethoxylates and mixtures thereof. The ethoxylated alcohols are present in a sufficient amount to provide stabilization of the suspension. Preferably, the ethoxylated alcohols are present in an amount of about 0 percent by weight or greater of the alumina containing composition, more preferably about 0.01 percent by weight or greater and most preferably about 0.05 percent by weight or greater. Preferably, the ethoxylated alcohols are present in an amount of about 1.0 percent by weight or less of the alumina containing composition, more preferably about 0.5 percent by weight or less and most preferably about 0.1 percent by weight or less.

The alumina containing composition may further comprise one or more fragrances. The one or more fragrances are present for the purpose of improving the smell of the alumina composition. Among preferred fragrances useful in the invention are orange fragrance, orange terpenes, citrus terpenes, tripenolene, turpentine, orange oil, pine oil, ester based fragrances and the like. The fragrances are present in a sufficient amount to improve the odor of the alumina composition. Preferably, the fragrances are present in an amount of about 0 percent by weight or greater of the alumina containing composition, more preferably about 0.01 percent by weight or greater and most preferably about 0.05 percent by weight or greater. Preferably, the fragrances are present in an amount of about 1.0 percent by weight or less of the alumina containing composition, more preferably about 0.5 percent by weight or less and most preferably about 0.1 percent by weight of less.

The alumina containing composition preferably is basic. It preferably exhibits a pH of about 8.5 or greater and more preferably about 9.0 or greater. It preferably exhibits a pH or about 10.5 or less and more preferably 10.0 or less.

The method of the invention comprises applying the alumina composition to the surface of glass to enhance the bonding of an adhesive to the surface. The surface may be glass or glass with a ceramic enamel frit applied to the glass. The alumina composition can be applied by any means known for applying a liquid composition to a surface including applying it with an absorbent material, such as a cloth, a sponge, a felt or a paper towel. The absorbent material is preferably saturated with the composition. Preferably, the absorbent material is lint free cloth. The composition can be applied and left on the surface of the glass or ceramic enamel frit or it can be removed with the use of a glass cleaner. The alumina composition can be applied at any temperature at which the alumina composition has suitable viscosity for application. The alumina composition is preferably applied at a temperature of about 0° C. or greater, more preferably about 10° C. or greater and most preferably about 20° C. or greater. The alumina composition is preferably applied at a temperature of about 40° C. or less, more preferably about 30° C. or less and most preferably about 25° C. or less. Before any other operation may be performed, it is preferred to allow the water to volatilize away. Usually the water volatilizes away in about 5 to about 10 minutes.

Thereafter, the surface to which the alumina containing composition was applied may be cleaned. The cleaner can be any cleaner used to clean glass in preparation for applying an adhesive to the glass or the ceramic enamel applied to the glass. Among known cleaners which may be used is BETA-CLEAN 3300 glass cleaner, BETACLEAN is a trademark of The Dow Chemical Company, Midland, Mich. USA. Preferred cleaning compositions comprise water and one or more straight or branched chain alcohols, alkoxy alcohols or mixtures thereof. Preferred alcohols include isopropanol, butanol, isobutanol, hexanol, 2-butoxyethanol, 3-butoxypropanol, 2-isopropoxyethanol, 3-isopropoxypropanol and the like. Preferably, the pH of the cleaning composition is adjusted with a base, such as ammonia, to match the pH of the alumina containing composition. Preferably, the pH of the cleaner is about 8.5 or greater and more preferably 9.0 or greater. Preferably, the pH of the cleaner is about 9.5 or less and more preferably 9.0 or less. The cleaner can be applied in any manner known to one skilled in the art, for instance by the application with an absorbent material such as a sponge, a lint-free cloth or a paper towel. Before any further step can be performed, the solvent of the cleaner is allowed to flash off, that is volatilized away. Typically, the solvent volatilizes away in about 2 to about 5 minutes.

The method of the invention may further comprise application of a glass primer to the surface of the glass or ceramic enamel deposited on the glass. Any primer known for use on glass and with the chosen adhesive can be used. Generally, the primer comprises a film forming resin, such as an isocyanate prepolymer, acrylic resin, silane functional resin, polyester resin, and the like; a silane containing component such as an aminosilane, isocyanato silane, mercapto silanes; and a solvent, such as aromatic hydrocarbons, ketones, hydrofurans and acetates. Examples of such primers include BETAPRIME™ 5500 glass primer and BETAPRIME™ 5504 glass primer, BETAPRIME is a trademark of The Dow Chemical Company, Midland, Mich. USA. If a primer is applied, it is applied after the application of the alumina containing composition and the cleaning step, if used, are completed. More particularly, the primer is applied after the water from the alumina containing composition has volatilized away. If a cleaning step is used the primer is applied after the solvent of the cleaning solution has flashed off, volatilized away. The primer may be applied by any means well known in the art. It may be applied manually by brushing, rolling or applying a cloth containing the composition to the surface of a substrate to which the adhesive will be applied such that a sufficient amount of the primer composition is applied to the surface. The primer can be applied by hand using an absorbent material such as a felt or sponge applicator, a primer stick or by robotic application, utilizing machines such as automated felt applicator as, e.g., provided by Nordson Deutschland GmbH, Erkrath, Germany or automated spray application equipment as e.g., provided by SCA Schucker GmbH, Bretten-Gölshausen, Germany or the M710I robotic system or available from Fanuc Robotics America, of Rochester Hills, Mich. used with an automated primer dispense applicator supplied by Nordson Corporation, Amherst, Ohio. Typically, a film of primer is deposited on the surface of the glass or ceramic enamel frit. Preferably, the film is 4 microns or greater and more preferably 5 microns or greater. Preferably, the film is 18 microns or less and preferably 15 microns or less. The primer is applied such that there is a dry time after priming of greater than 30 seconds after spray application and about 180 seconds after application using on absorbent material. The adhesive is applied at least 20 seconds after application of the primer.

The primer may further contain a component that fluoresces when illuminated by ultraviolet light. Fluorescing components are readily available from numerous sources, for example, Aldrich Chemical Company, Milwaukee, Wis. As a specific example, the fluorescing component can be Uvitex OB brand fluorescing agent available from Ciba Specialty Chemicals, Tarrytown, N.Y. (USA). The amount of fluorescing agent added to the primer must be sufficient so that the area of the window treated with the primer is apparent when the window is illuminated with an ultraviolet light.

One process for applying a primer to a surface such as a window or a surface of a metal, plastic or composite which may be coated, comprises the steps of: (a) directing light onto the surface to illuminate a portion of the surface and (b) applying a primer along the illuminated portion of the surface. If the adhesion primer contains a component that evaporates, then the process can further include the step of forming an infrared image of the surface as the component evaporates to indicate the area of application of the adhesion primer. If the adhesion primer contains a component that fluoresces when illuminated by ultraviolet light, then the process can further include the step of illuminating the surface with ultraviolet light to indicate the area of application of the adhesion primer. These processes may be performed as disclosed in commonly assigned PCT Application 2003/19745 filed Jun. 11, 2003, incorporated herein by reference.

The glass substrate is glass which preferably has a ceramic enamel frit disposed on a portion of the surface of the glass. The glass can be flat or shaped. Included in shaped glass is glass having a curved surface. Preferably, the glass is used as a window and the ceramic enamel frit is located about the periphery of the glass. Preferably, the ceramic enamel is located about the periphery of the glass such that it is capable of blocking transmission of light to prevent it from contacting the adhesive, which bonds the window into a structure. The ceramic enamel frit on the periphery also hides the trim components disposed about the periphery of the window. The glass is preferably used as a window and preferably used as a window in an automobile. FIG. 1 illustrates a window treated according to the method of the invention. FIG. 1 illustrates a window (10) with a frit (11) located about the periphery of the window (10). In another embodiment, the invention is a process for installing a window made of glass, optionally with a ceramic enamel frit disposed about the periphery of the window and an adhesive applied to the periphery of the glass or to the ceramic enamel about the periphery of the glass. FIG. 2 illustrates a window with the adhesive disposed on the window, wherein a window (10) has located on it a frit (11) and applied to the frit on the window is a bead of adhesive (12). The bead of adhesive (12) is disposed about the periphery of the window (10) such that it forms a continuous bead of adhesive (12) which is capable of completely sealing around the periphery of the window. FIG. 3 illustrates a stepped cross section of the bond between the structure and the window. The figure shows the glass (10) and the organic frit (11). Located adjacent to the organic frit (11) are the adhesive (12) and the flange of the structure (13) to which it is bonded.

In a preferred embodiment, the alumina containing composition is used in the process to replace windows in structures or vehicles and most preferably in vehicles. The first step is removal of the previous window. This can be achieved by cutting the bead of the adhesive holding the old window in place and then removing the old window. Thereafter, the new window is cleaned, treated according to the method of the invention and primed. The old adhesive that is located on the window flange can be removed, although it is not necessary and in most cases it is left in place. The window flange is preferably primed with a paint primer or an activator system. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure.

The adhesive used to bond glass to a substrate can be any known adhesive bead useful in bonding glass to structures. In one embodiment, the adhesive can be an isocyanate functional, siloxy functional or combination of isocyanate and siloxy functional adhesive which cures when exposed to moisture. The system can utilize any isocyanate functional adhesive which is designed for bonding to non-porous surfaces such as metal, coated plastic and/or glass. Examples of useful adhesive systems are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,976,305, U.S. Pat. No. 5,852,137, U.S. Pat. No. 6,512,033, relevant portions incorporated herein by reference. Examples of commercial adhesives which may be used herein are BETASEAL™ 15630, 15625, 61355 adhesives available from The Dow Chemical Company. EFBOND™ windshield adhesives available from Eftec, WS151™, WS212™ adhesives available from Yokohama Rubber Company, and SIKAFLEX™ adhesives available from Sika Corporation.

In one embodiment, the adhesive composition of the invention contains a polymer having a flexible backbone and having silane moieties capable of silanol condensation. The polymer with a flexible backbone can be any polymer with a flexible backbone which can be functionalized with a silane capable of silanol condensation. Among preferred polymer backbones are polyethers, polyurethanes, polyolefins and the like. Among more preferred polymer backbones are the polyethers and polyurethanes, with the most preferred being the polyethers. Examples of such adhesive compositions are those disclosed in Mahdi, U.S. 2002/01550 A1 and Wu et al., U.S. Pat. No. 6,649,016. Even more preferably, the polymer is a polyether having silane moieties capable of silanol condensation. In some embodiments, the polymers useful in the invention are polymers as disclosed in Yukimoto et al., U.S. Pat. No. 4,906,707; Iwakiri et al., U.S. Pat. No. 5,342,914; Yukimoto, U.S. Pat. No. 5,063,270; Yukimoto et al., U.S. Pat. No. 5,011,900; or Suzuki et al., U.S. Pat. No. 5,650,467, all incorporated herein by reference. More preferably such polymers are oxyalkylene polymers containing at least one reactive silicon group per molecule.

The terminology "reactive silicon group" or "reactive silane capable of silanol condensation" means a silicon-containing group in which a hydrolyzable group or a hydroxyl group is bonded to the silicon atom and which is cross-linkable through silanol condensation reaction. The hydrolyzable group is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxy-group, a mercapto group, and an alkenyloxy group. An alkoxy group is more preferred, with a methoxy or ethoxy group being most preferred, for ease in handling due to their mild hydrolyzability. One to three hydroxyl groups or hydrolyzable groups may be bonded to one silicon atom. Where two or more hydroxyl groups or hydrolyzable groups are present per reactive silicon group, they may be the same or different. The reactive silicon group may have one or more silicon atoms.

In one embodiment, the flexible polymer used in the adhesive composition is a silyl terminated prepolymer prepared by contacting a polyol as described herein with an isocyanato silane having at least one silane moiety, which has bonded thereto a hydrolyzable moiety under conditions such that the hydroxyl moieties of the polyol react with the isocyanate moieties of the isocyanato silane so as to place a terminal silane moiety on the polyol, preferably the contacting is performed without addition of catalyst. Polyols which may be used to prepare the silyl terminated prepolymer include polyols useful in preparing polyurethane prepolymers useful in adhesive and elastomer applications and are well known to those skilled in the art. The polyols can be reacted with an isocyanato silane to prepare reactive silicone functional prepolymers. Such isocyanato silane requires a silane group with a hydrolyzable moiety attached thereto. Isocyanato silanes useful in the invention are described in U.S. Pat. No. 4,618,656 at column 3, lines 24 to 34, incorporated herein by reference. The reaction of the polyol with an organo functional silane can be performed using conventional processes such as those disclosed in U.S. Pat. No. 4,625,012, incorporated herein by reference. If desired, a standard polyurethane catalyst such as those disclosed in U.S. Pat. No. 4,625,012 at column 5, lines 14 to 23, may be added. The reaction of the isocyanato silane with a polyol can take place at a temperature of about 0° C. or greater, more preferably about 25° C. or greater, and preferably about 150° C. or less and most preferably about 80° C. or less. This reaction is preferably performed under an inert atmosphere. The reaction is allowed to proceed until the desired silane functionality is achieved. In another embodiment, the polymer may be a polyurethane based backbone having hydrolyzable silane groups. Such materials are disclosed in Chang, U.S. Pat. No. 4,622,369 and Pohl, U.S. Pat. No. 4,645,816, relevant portions incorporated herein by reference. In another embodiment, the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation. The silicon compound can be added to the polymer at the point of unsaturation by a hydrosilylation reaction. This reaction is described in Kawakubo, U.S. Pat. No. 4,788,254, column 12, lines 38 to 61; U.S. Pat. Nos. 3,971,751; 5,223,597; 4,923,927; 5,409,995 and 5,567,833, incorporated herein by reference. The polymer prepared can be crosslinked in the presence of a hydrosilylation crosslinking agent and hydrosilylation catalyst as described in U.S. Pat. No. 5,567,833 at column 17, lines 31 to 57, and U.S. Pat. No. 5,409,995, incorporated herein by reference.

In general, the method of bonding glass, such as a window, to a substrate comprises, applying an adhesive to the surface of the glass along the portion of the glass which is to be bonded to the structure which has the composition of this invention coated thereon. Where a ceramic enamel frit is present the adhesive is applied to the surface of the ceramic enamel frit. The adhesive is thereafter contacted with the second substrate such that the adhesive is disposed between the glass and the second substrate. The adhesive is allowed to cure to form a durable bond between the glass and the substrate. In a preferred embodiment, one substrate is glass the other substrate is a plastic, metal, fiberglass or composite substrate (for instance cured sheet molding compound) which may optionally be painted. This method is especially effective for substrates painted with an acid resistant paint. Generally, the adhesives are applied at ambient temperature in the presence of atmospheric moisture. Exposure to atmospheric moisture is sufficient to result in curing of the adhesive. Curing may be further accelerated by applying heat to the curing adhesive by means of convection heat or microwave heating.

SPECIFIC EMBODIMENTS OF INVENTION

The following examples are included for illustrative purposes only and are not intended to limit the scope of the invention. Unless otherwise stated, all parts and percentages are by weight.

The efficiency of an alumina containing composition comprising 39.1 weight percent water, 49.5 weight percent alumina, 10.0 weight percent white mineral oil (petroleum), 0.9 weight percent sodium lauryl sulphate, 0.4 weight percent hydroxyethylcellulose, 0.03 weight percent fatty alcohol ethoxylated and 0.09 weight percent orange fragrance for enhancing the bonding of adhesives to glass surfaces is determined by quick knife (peel) tests on silicone contaminated enamel frits in comparison to alternative treatment processes.

Preparation of Samples for Testing

Silicone contaminated ceramic frits are treated with the alumina containing composition and/or cleaned with different cleaners, specifically BETACLEAN™ 3300 glass cleaner and/or BETACLEAN™ 3350 glass cleaner as described hereinafter. After a flash-off time of two minutes BETAPRIME™ 5500 glass primer system is applied and after 5 minutes open time BETASEAL™ 2002 LVRP isocyanate functional polyurethane based adhesive system is applied. BETACLEAN, BETAPRIME and BETASEAL are trademarks of The Dow Chemical Company. The primer is applied on ceramic enamel frit with a standardized primer applicator to achieve a uniform film thickness. The primer applicator comprises a polyethylene bottle with a mounted felt, where the felt material is wool with a density $0.16+/-0.021$ $gcm^{-3}$ and a diameter of 2.2 cm provided by Filzfabrik Fulda, Fulda, Germany. After an open time of 5 minutes, an adhesive bead with 10 mm (height)× 10-15 mm (width)×200 mm (length) is applied. The adhesive bead is compressed to a height of approximately 6 mm. The test sample is cured and exposed to the following conditions: (1) 7 days at 23° C. at 50 percent relative humidity (rh.), (2) plus 7 days in water at 23° C., and (3) 7 days of cataplasma. Cataplasma treatment includes the packaging of the sample with cotton and saturation of the cotton packaging with 10 fold water and consecutively wrapping in aluminum foil and PE foil to avoid evaporation. The packed sample is exposed 7 days at 70° C., 16 hours at −20° C., brought to ambient temperature and the unwrapped sample is stored 2 hours at 23° C.

Quick Knife Test

To evaluate the adhesion performance, a quick knife test is performed after each of the exposures (1), (2) and (3). In the quick knife test, the adhesive bead is cut on the edge approximate 10 mm parallel to the substrate and peeled of in a 90° angle. Approximately after each 10 mm, the peeled off bead is cut with a knife to the substrate and peeling off is continued. The peeled samples are rated according to the percentage of cohesive failure. Cohesive failure of greater than 80 percent is considered to be sufficient for glazing applications.

The results are summarized in Table 1.

TABLE 1

Peel adhesion tests on silicone contaminated windscreens after application of different treatments

| | Cleaning steps | application | primer | 23° C./50% Rf | 7 d. RT | +7 d. H2O | +7 d. Cat |
|---|---|---|---|---|---|---|---|
| 1 | BC 3300 [1] | paper tissue | BP 5500 | 5' | 60cf | 50cf | 50cf |
| 2 | BC 3300 [1]/BC 3350 [2] | paper tissue | BP 5500 | 5' | 60cf | 70cf | 90cf |
| 3 | Alumina comp[3]/BC 3300 [1] | paper tissue | BP 5500 | 5' | 100cf | 100cf | 100cf |
| 4 | Alumina comp [3]/BC 3300 [1] | scotch brite | BP 5500 | 5' | 100cf | 100cf | 100cf |
| 5 | Alumina comp [3] | paper tissue | BP 5500 | 5' | 90cf | 95cf | 100cf |

[1] BETACLEAN ™ 3300 glass cleaner.
[2] BETACLEAN ™ 3350 glass cleaner.
[3] Alumina containing composition described above.

The application of the alumina containing composition described above on silicone contaminated ceramic frits, cleans and prepares the surface for bonding more efficiently than the other tested glass cleaning systems alone. Entry 5 in Table 1 also demonstrates that cleaning after the application of the alumina containing composition described above is not a necessity for acceptable bonding.

Figure 5:
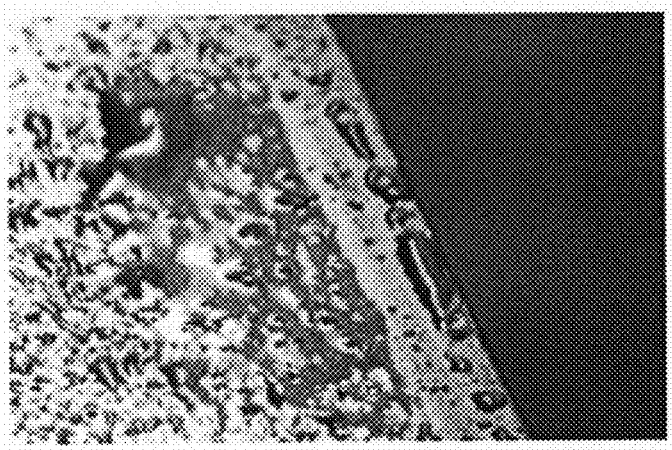
FIG. 5 shows a second surface treated using a prior art process.

The application of BETACLEAN™ 3300 glass cleaner after the cleaning step with the alumina containing composition described above facilitates the visualization of the cleaning efficiency on the basis of the wetting behavior of the cleaner. FIG. 4 shows a picture of the wetting behavior of BETACLEAN™ 3300 glass cleaner on a ceramic frit after treatment with the alumina containing composition which indicates a clean surface. FIG. 5 is a picture of the wetting behavior of BETACLEAN™ 3300 glass cleaner on a ceramic frit without treatment with the alumina containing composition which indicates a silicon contaminated surface.

What is claimed is:

1. A method comprising:
   a. contacting a composition comprising:
      i) alumina particles having a particle size of about 1 to about 40 microns and a Mohs hardness of about 9.0 to about 9.5;
      ii) one or more alkyl sulphates;
      iii) one or more thickeners; and
      iv) water
      with a silicone contaminated glass surface or a silicone contaminated ceramic enamel frit surface disposed on a glass surface,
   b. cleaning the glass surface or the ceramic enamel frit with a cleaner after the step of contacting; and
   c. applying a primer system to the glass surface or the surface of the ceramic frit after the step of cleaning;
   wherein the primer is applied after a solvent in the cleaner is allowed to flash off.

2. A method according to claim 1 wherein the contacting is performed by applying the composition to the glass surface or the surface of the ceramic frit using an application apparatus.

3. A method according to claim 2 wherein the composition comprises:
   i) about 10 to about 80 percent by weight of the alumina particles;
   ii) about 0.1 to about 5 percent by weight of the one or more alkyl sulphates;
   iii) about 1 to about 10 percent by weight of the one or more thickeners; and
   iv) about 15 to about 80 percent by weight of water.

4. A method according to claim 3 wherein the composition further comprises a lubricant.

5. A method according to claim 4 wherein the lubricant is present in an amount of greater than 0 to about 25 percent by weight.

6. A method according to claim 4 wherein the composition further comprises one or more ethoxylated alcohols.

7. A method according to claim 6 wherein the one or more ethoxylated alcohols are present in a sufficient amount to provide a stable suspension.

8. A method according to claim 6 wherein herein the composition further comprises one or more fragrances.

9. A method according to claim 8 wherein the one or more fragrances are present in an amount of greater than 0 to about 0.1 percent by weight.

10. A method according to claim 1 wherein the one or more thickeners comprises cellulose, a derivative of cellulose, clay, or an acrylic polymer.

11. A method according to claim 1 wherein the cleaner is a mixture of water and alcohols.

12. A method according to claim 1, wherein the method further comprises applying a glass primer system to the surface of the ceramic frit after applying the composition containing alumina particles.

13. A method according to claim 1 which further comprises applying an adhesive to the ceramic frit surface of the glass and
contacting the adhesive applied to the ceramic frit surface of the glass with a second substrate
wherein the adhesive is disposed between the ceramic frit surface of the glass and the second substrate.

14. A method according to claim 13 wherein the second substrate is a flange of a window frame.

15. A method according to claim 14 wherein the second substrate is the flange of a window for an automobile.

16. A method of replacing a window in a structure which comprises
   a) removing the old window from the window frame;
   b) applying to a silicone contaminated surface of a ceramic enamel frit disposed on a surface of a replacement glass window a composition comprising:

i) alumina particles having a particle size of about 1 to about 40 microns and a Mohs hardness of about 9.0 to about 9.5;
ii) one or more alkyl sulphate;
iii) one or more thickeners;
iv) a lubricant in an amount of greater than 0 percent by weight to about 11 percent by weight;
one or more ethoxylated alcohols having from about 6 to about 22 carbon atoms; and
v) water in an amount of about 35 percent by weight to about 80 percent by weight;
c) optionally, cleaning the surface of the ceramic frit with a cleaner, after the step of applying a composition, and
d) optionally, applying a primer system to the surface of the ceramic frit;
e) applying a bead of adhesive to the glass window around the periphery of the ceramic frit;
f) applying an activator system to the old adhesive remaining on a flange of the window frame;
g) contacting the adhesive applied to the window with the window frame so that the adhesive is disposed between the window and the flange and the adhesive forms a sea between the window and the window frame.

17. The method according to claim 4 wherein the alumina particles exhibit an oil absorption of about 10 percent by weight or greater and
wherein the lubricant is present in a sufficient amount to control break-up of the alumina particles.

18. The method according to claim 6 wherein the one or more ethoxylated alcohols have from about 6 to about 22 carbon atoms.

19. The method according to claim 11, wherein the water in the composition is allowed to volatilize away before any subsequent steps are performed.

* * * * *